(12) United States Patent
Snoeren et al.

(10) Patent No.: US 6,226,351 B1
(45) Date of Patent: May 1, 2001

(54) X-RAY EXAMINATION APPARATUS WITH A HIGH-RESOLUTION IMAGE SENSOR

(75) Inventors: Rudolph M. Snoeren; Bartholomeus G. M. H. Dillen; Willibrordus H. F. M. Van Den Meijdenberg, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/360,217

(22) Filed: Jul. 23, 1999

(30) Foreign Application Priority Data

Jul. 23, 1998 (EP) .................................................. 98202480

(51) Int. Cl.[7] .................................................. H05G 1/64
(52) U.S. Cl. ...................... 378/98.12; 378/98.3; 378/98.8
(58) Field of Search .................... 378/98.3, 98.8, 378/98.12

(56) References Cited

U.S. PATENT DOCUMENTS

| | | | |
|---|---|---|---|
| 4,967,264 | * 10/1990 | Parulski et al. ....................... | 348/271 |
| 5,087,809 | * 2/1992 | Jackson ................................. | 250/226 |
| 5,434,429 | * 7/1995 | Dillen et al. ......................... | 250/559.3 |
| 5,436,952 | * 7/1995 | Haendle et al. ...................... | 378/98.7 |
| 5,559,849 | * 9/1996 | Bruijns ................................. | 378/98.2 |
| 5,602,896 | * 2/1997 | Diepstraten ........................... | 378/98.7 |
| 5,778,044 | * 7/1998 | Bruijns ................................. | 378/98.7 |
| 5,859,892 | * 1/1999 | Dillen .................................. | 378/98.12 |
| 5,974,113 | * 10/1999 | Bruijns et al. ....................... | 378/98.7 |
| 6,130,932 | * 10/2000 | Diepstraten ........................... | 378/98.7 |

FOREIGN PATENT DOCUMENTS

0655860A1  5/1995 (EP) ................................ H04N/3/15

* cited by examiner

*Primary Examiner*—Robert H. Kim
*Assistant Examiner*—Allen C. Ho
(74) *Attorney, Agent, or Firm*—John F. Vodopia

(57) ABSTRACT

An X-ray examination apparatus comprises an X-ray detector (1) for deriving an optical image from an X-ray image. An image pick-up device (2) derives an image signal from the optical image. The image pick-up device (2) is provided with an image sensor (3,4) having a plurality of sensor elements. The effective surface area of the sensor elements differs for different optical spectral components of the optical image. The image pick-up device is provided with an adjusting system for selecting an optical spectral component. The image signal is derived from the selected optical spectral component.

12 Claims, 3 Drawing Sheets

X-RAY EXAMINATION APPARATUS WITH A HIGH-RESOLUTION IMAGE SENSOR

BACKGROUND OF THE INVENTION

1. Field of the Invention

The invention relates to an X-ray examination apparatus which includes an X-ray detector for deriving an optical image from an X-ray image, and an image pick-up apparatus for deriving an image signal from the optical image, which image pick-up apparatus includes an image sensor provided with plurality of sensor elements.

2. Description of Related Art

An X-ray examination apparatus of this kind is known from European patent application EP 0 655 860.

The known X-ray examination apparatus includes an image pick-up apparatus with an adjustable spatial resolution. The image pick-up apparatus of such an X-ray examination apparatus is provided with a semiconductor CCD image sensor in which sensor elements are defined by way of gate electrodes. Incident light is absorbed in the semiconductor material of the individual sensor elements so that electric charges, electrons or holes, are released in the sensor elements. Said electric charges are collected in the sensor elements after which they are transported to a read-out register and the image signal is derived from the electric charges in the read-out register by means of a read-out amplifier.

The CCD image sensor in the known X-ray examination apparatus is notably provided with groups of collecting gate electrodes which are isolated from one another by isolating gate electrodes. The collecting gate electrodes receive an electric voltage whose polarity opposes that of the charge of electric charges collected in the relevant sensor elements. The isolating gate electrodes receive an electric voltage having the same polarity as the electric charges being collected. The spatial resolution of the known image pick-up apparatus is determined by adjusting the gate electrodes to the collecting state or the isolating state. The spatial resolution of the known image pick-up apparatus is thus adjustable. However, when an image containing a large number of pixels, for example 1000×1000 pixels, is to be picked up by means of an equally large number of sensor elements, an intricate operation is required to change the spatial resolution of the known image pick-up apparatus, because a very large number of gate voltages must be adapted. It is notably difficult to pick up an image of large dimensions with a high spatial resolution by means of the known X-ray examination apparatus.

SUMMARY OF THE INVENTION

It is an object of the invention to provide an X-ray examination apparatus which includes an X-ray detector or image pick-up apparatus whose spatial resolution can be readily changed.

This object is achieved by means of an X-ray examination apparatus according to the invention which is characterized in that an active surface area of individual sensor elements differs for individual optical spectral components of the optical image, and that the image pick-up apparatus is provided with an adjusting system for selecting such an optical spectral component in order to derive the image signal therefrom by means of the image sensor.

The spatial resolution of the image pick-up apparatus is not high in the case of a large active surface area of individual sensor elements. The smaller the active surface area, the higher the spatial resolution will be. The spatial resolution of the image pick-up apparatus differs for the individual optical spectral components. This enables adjustment of the spatial resolution of the image pick-up apparatus by selecting such an optical spectral component and deriving the image signal therefrom.

The optical spectral components of the optical image are components of the optical image having different optical frequency ranges. Such different optical frequency ranges may have optical frequencies in common or not. The essential aspect is that the different optical spectral components of the optical image are components of different colors of the optical image and that the spatial resolution of the image pick-up apparatus deviates for the different colors of the optical image. Such optical spectral components can be selected by means of optical elements such as optical spectral absorption filters, optical grids or optical interference filters.

When the active surface of the individual image sensors is large, the spatial resolution is low but the sensitivity of the image sensors to the optical image is very high. A high sensitivity means that the image pick-up apparatus delivers an image signal having a high signal level even when the intensity of the incident light is low. Selection of a suitable optical frequency component of the optical image enables the image pick-up apparatus to be switched, if desired, between a state of high spatial resolution or a state of high light sensitivity. In the case of X-ray fluoroscopy, during which a patient to be examined is irradiated for a prolonged period of time but with a low X-ray intensity, it is notably advantageous to adjust the image pick-up apparatus to the state of high sensitivity. During an X-ray exposure, where a high X-ray intensity is applied during a brief period of time, preferably the state of high spatial resolution is adjusted. The fact that in that case the sensitivity of the image pick-up apparatus is somewhat lower is not objectionable, because the high X-ray intensity ensures that, even in the case of a low sensitivity, the brightness of the optical image is sufficiently high to derive an image signal having a high signal-to-noise ratio from the optical image. It is thus ensured that even very small details in the X-ray image can be suitably visualized in the case of an X-ray exposure.

Preferably, the sensor elements are provided with an optical spectral filter section having a transmission profile which varies in a lateral direction. The lateral direction is an arbitrary direction in the plane of the sensor elements on which the light is incident. The transmission profile is the transmittance for incident light as a function of the optical frequency of the incident light. The transmission profile of the optical spectral filter section varies in the lateral direction in the surface of individual sensor elements on which the light of the optical image is incident. Thus, the position in the lateral direction determines which optical spectral component is transmitted by the optical spectral filter section of the sensor elements. This means that individual parts of a sensor element are sensitive to different optical spectral components of light of the optical image. These individual parts may overlap or not. It is notably possible to realize such a lateral variation of the transmission profile that one spectral component can reach only half the surface of individual sensor elements whereas another spectral component can reach the entire surface of individual sensor elements. The optical spectral filter section associates different optical spectral sensitivities for individual optical spectral components with different spatial sensitivities. Picking up different optical spectral components individually by means of the relevant separate parts of the sensor elements enables the image signal to be derived from separate optical spectral components of the optical image.

The image pick-up apparatus preferably includes an adjustable optical spectral filter unit for isolating an optical spectral component from the optical image. In different settings of the adjustable optical spectral filter unit different optical spectral components of the optical image are admitted to the image sensor. Preferably, the optical spectral filter unit is adjustable by displacement in space of the optical spectral filter unit. The position of the optical spectral filter unit then determines which optical spectral component of the optical image can reach the image sensor. When the spectral filter unit is arranged in front of the image sensor in the image carrying light beam, essentially only the optical spectral component for which the filter has a high transmittance will be admitted to the image sensor. When the spectral filter unit is not arranged in front of the image sensor but outside the light beam, substantially all light in the light beam will reach the image sensor. Because the spatial resolution of the image sensor differs for individual optical spectral components, it is achieved that the spatial resolution of the image pick-up apparatus can be adjusted by displacement of the spectral filter unit.

Preferably, the transmission profiles of the filter unit and the filter section of the sensor elements are essentially complementary in a spectral sense. The image pick-up apparatus can be adjusted more accurately as the overlap of the transmission profiles is smaller. The adjustment of the adjustable optical spectral filter unit determines which part of respective sensor elements is reached by light of the optical image. This is because such an optical spectral component, isolated by the adjustable optical spectral filter unit, is admitted to respective parts of the sensor elements by the optical spectral filter section of the sensor elements. More specifically, a comparatively spectrally narrow optical spectral component is isolated when the adjustable optical spectral filter unit is arranged in front of the image sensor. The spectrally narrow component reaches only the parts of the sensor elements which are not shielded from said component by the optical spectral filter section of the sensor elements. The active surface of the sensor elements is then small so that the image pick-up apparatus has a high spatial resolution. When the adjustable optical spectral filter unit in front of the image sensor is removed, a spectrally wider component, possibly even all light of the optical image, is used. When a suitable transmission profile of the optical spectral filter section of the sensor elements is used, it is achieved that said spectrally wider component reaches substantially the entire surface of the individual sensor elements. Consequently, the image pick-up apparatus then has a low spatial resolution, but a high sensitivity.

It is known per se that the active surface of sensor elements can be influenced on the basis of the electric voltage applied to the gate electrodes of the sensor elements. The spatial resolution in two substantially perpendicular directions can be made practically equal by influencing the magnitude of the active surface in the direction transversely of the lateral direction in which the transmission profile varies. It is thus achieved that the spatial resolution is substantially uniform in all directions in the plane of the image sensor. Consequently, the X-ray examination apparatus is then suitable for accurately picking up small and large details in the X-ray image, irrespective of the direction of such details in the image.

The invention also relates to an X-ray examination apparatus which is provided with an X-ray detector for deriving an image signal from an X-ray image, which X-ray detector is provided with an image sensor which includes a plurality of sensor elements. An X-ray examination apparatus according to the invention enables adjustment of the spatial resolution.

In detail, such an X-ray examination apparatus includes an X-ray detector for deriving an image signal from an X-ray image, which X-ray detector is provided with an image sensor with a plurality of sensor elements, wherein an active surface area of individual sensor elements differs for individual spectral components of the X-ray image, and wherein the X-ray detector is provided with an adjusting system for selecting the individual spectral components of the X-ray image in order to derive the image signal therefrom.

The X-ray examination apparatus according to the invention is provided with an X-ray detector having different spatial resolutions for different energy components of the X-rays. The spatial resolution of the X-ray detector can be adjusted by selection of the energy components.

BRIEF DESCRIPTION OF THE DRAWING

These and other aspects of the invention will be described by way of example in detail hereinafter with reference to the following embodiments and the accompanying drawing; therein.

DETAILED DESCRIPTION OF THE PREFERRED EMBODIMENT

Figure 1:
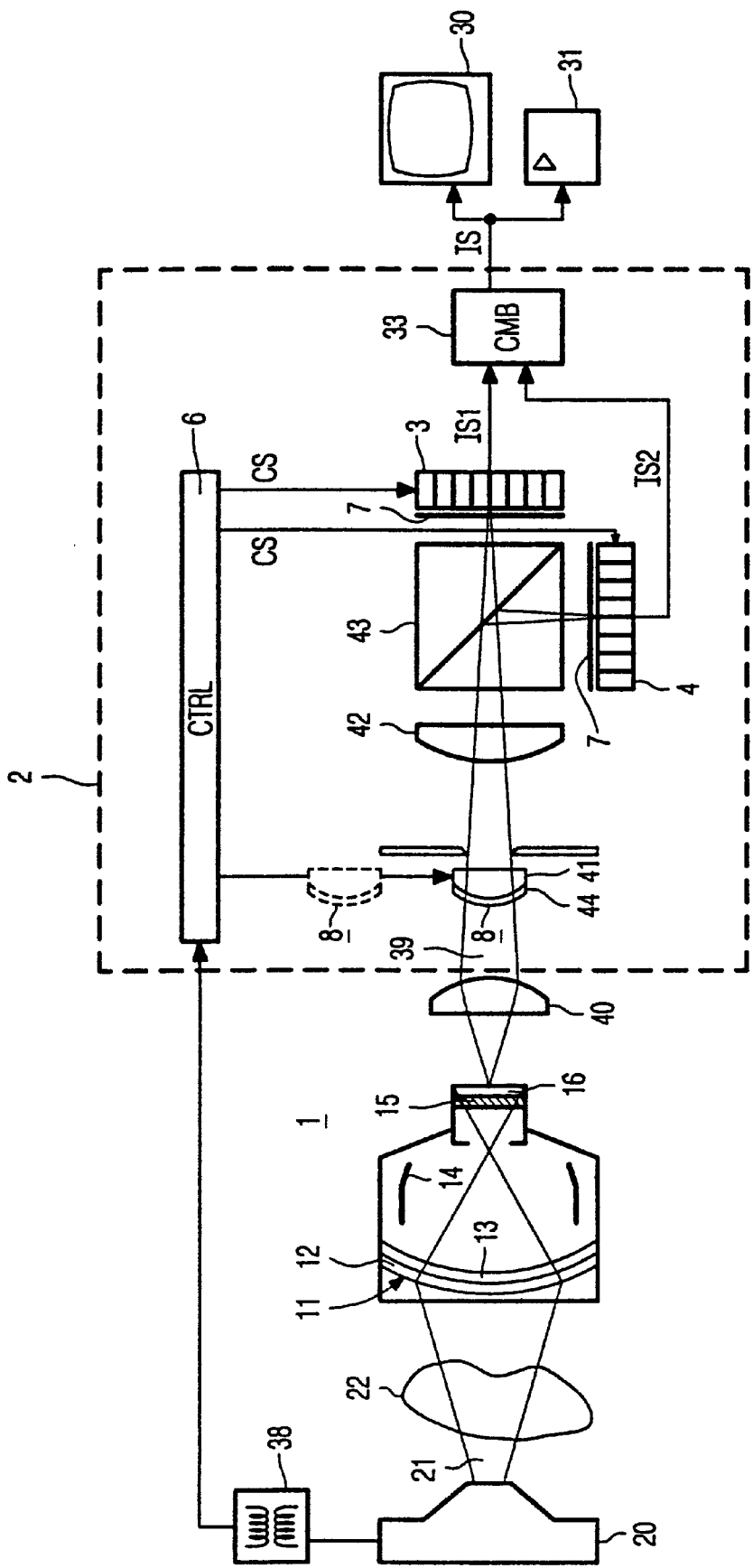
FIG. 1 is a diagrammatic representation of an X-ray examination apparatus in which the invention is used.

FIG. 1 is a diagrammatic representation of an X-ray examination apparatus in which the invention is used.

The X-ray examination apparatus includes an X-ray source 20 which emits an X-ray beam 21 in order to irradiate the patient 22 to be examined. The X-ray image is formed on the X-ray detector 1 due to local differences in the X-ray absorption within the patient 2. The X-ray detector in the embodiment shown in FIG. 1 consists of an X-ray image intensifier, but use can also be made of, for example, a conversion screen which converts X-rays into low-energy radiation such as visible light, infrared radiation or ultraviolet radiation. The X-ray detector converts the X-ray image into an optical image. The optical image is formed by means of low-energy radiation such as visible light, infrared radiation or ultraviolet radiation. An image signal (IS), for example an electronic video signal, is derived from the optical image by means of the image pick-up apparatus 2. This image signal is applied to a monitor 30 on which the image information of the X-ray image is displayed. The image signal is also applied to a buffer unit 31; the signal levels of the image signal are stored in the buffer unit so as to await further processing or to make a hardcopy of the image represented by the image signal.

The X-ray beam 21 is incident on an entrance screen 11 of the X-ray image intensifier 1. The entrance screen 11 includes a conversion layer 12, for example a sodiumdoped cesium iodide (CsI:Na) layer, and a photocathode 13. The cesium iodide layer converts the incident X-rays into blue light or ultraviolet radiation whereto the photocathode is sensitive. The blue light or ultraviolet radiation from the conversion layer releases electrons from the photocathode. These electrons are conducted to a phosphor layer 15 on an exit window 16 by means of an electron optical system 14. The electron optical system 14 images the photocathode electron-optically on the phosphor layer 15. The electrons from the photocathode which are incident on the phosphor layer generate the low-energy radiation, preferably visible light, in the phosphor layer so that the optical image is formed on the exit window 16.

The light from the exit window is collected so as to form an essentially parallel light beam 39 by means of a collimator lens 40, and a correction lens 41 and a camera lens 42 focus the light of the parallel beam on the image sensors 3, 4. The image sensors 3, 4 are mounted on two different exit faces of a beam splitter in the form of a splitting cube 43. The beam splitter includes two prisms which are arranged one against the other in such a manner that their oblique sides form a reflecting surface 44. The splitting cube 43 splits the incident converging light beam into two converging sub-beams, the individual converging sub-beams being focused on the respective image sensors. The image sensors are, for example CCD sensors with a large number of light-sensitive sensor elements and are arranged relative to the beam splitter 43 in such a manner that pixels in the optical image which are imaged on light-sensitive elements of one image sensor are imaged in intermediate spaces between light-sensitive elements of the other image sensor. Each of the individual image sensors supplies a sub-image signal (IS1, IS2) which is applied to a combination unit 33. The combination unit 33 derives the image signal from the sub-image signals (IS1, IS2). For example, the individual image sensors 3, 4 pick up alternating bands of the optical image. Each of the image sensors supplies an electronic sub-image signal (IS1, IS2) having signal levels representing brightness values in the sub-images. The electronic sub-image signals (IS1, IS2) are combined in the combination unit so as to form the image signal (IS) in the form of the electronic video signal whose signal levels represent brightness values for the optical image. The image pick-up apparatus 1 supplies the electronic video signal for the composite high-resolution image in order to achieve a suitably visible reproduction of image information contained in a medical X-ray image containing small details. For example, use is made of two image sensors, each of which comprises 512×1024 sensor elements; the combination unit then supplies an image signal representing an image comprising 1024×1024 pixels. When the invention is used in such an image pick-up apparatus comprising a plurality of image sensors, the spatial resolution can be adjusted and, moreover, the number of pixels can be effectively increased; for example, the number of pixels can be effectively quadrupled, so that the image signal represents an image comprising 2048×2048 pixels. It is to be noted, however, that it is also advantageous to use the invention in an image pick-up apparatus which includes only a single image sensor, without a beam splitter, and the camera lens focuses the optical image on the single image sensor.

Each of the image sensors includes a spectral filter section 7 in the form of a yellow filter which covers a part (one half in the example shown) of each of the sensor elements. The yellow filter 7 ensures that the spectral part of the light which is not transmitted by the yellow filter does not reach the sensor elements so that the effective surface area of the sensor elements becomes smaller, i.e. it is approximately halved, for the light which is not or only hardly transmitted by the yellow filter. The light which is not or only hardly transmitted by the yellow filter, being more or less blue light, can reach only the smaller part of the sensor elements covered by the yellow filter. The correction lens 41 is provided with an optical filter 44; the correction lens 41 and the optical filter 44 together constitute the adjustable optical spectral filter element 8. The correction lens serves to enhance the axial chromatic aberration and also acts as a substrate for the blue filter. The correction lens 41, together with the optical filter 44 provided thereon, can be moved into or out of the light beam as desired, so that the optical filter element 8 is adjustable. The displacement of the optical spectral filter element is controlled by means of a control unit 6. This control unit 6 also controls the gate voltages applied to the gate contacts of the image sensors. The optical spectral filter unit 8 constitutes, in conjunction with the control unit 6, the adjusting unit for selecting the optical spectral component of the light of the optical image in order to derive the image signal therefrom. The control unit 6 supplies the image sensors with an adjusting signal CS in order to adjust the active surface area of the sensor elements; the control unit notably applies the adjusting signal CS to row driver circuits 28 of the image sensors 3, 4 in order to control the gate voltages applied to the gate contacts of the image sensors. The control unit 6 and the row driver circuits 28 thus together constitute the control system for influencing the active cross-section of the sensor elements. According to one adjustment, the correction lens 41 with the optical filter 44 provided thereon is present in the light beam; according to another adjustment the correction lens 41 with the optical filter 44 provided thereon is situated outside the light beam. The optical filter 44 is, for example, a blue filter 44 which essentially transmits only blue light and essentially blocks yellow light.

When the optical spectral filter element 8 is positioned in the light beam, essentially only blue light can reach the image sensors and, due to the effect of the yellow filter, the blue light reaches only the parts of the sensor elements which are not covered by the yellow filter 7. When the optical spectral filter element 8 is positioned outside the light beam, yellow as well as blue light reaches the image sensors and, due to the effect of the yellow filter, the blue light reaches essentially only the parts of the sensor elements which are not covered by the yellow filter whereas the yellow light reaches essentially the entire sensor elements. It is thus achieved that substantially the entire surface of the individual sensor elements is active so as to collect the light of the optical image when the optical spectral filter elements are positioned outside the light beam, and that an essentially smaller part (approximately one half) of the surface area of the individual sensor elements is active to collect (exclusively the yellow) light of the optical image when the optical spectral filter element are positioned in the light beam.

The control unit 6 is connected to a high voltage generator 38. The high voltage generator 38 supplies the X-ray source 20 with an electric high voltage. The spatial resolution and the sensitivity of the image pick-up apparatus can thus be controlled on the basis of the intensity and/or the energy of the X-ray beam 21.

Figure 2:
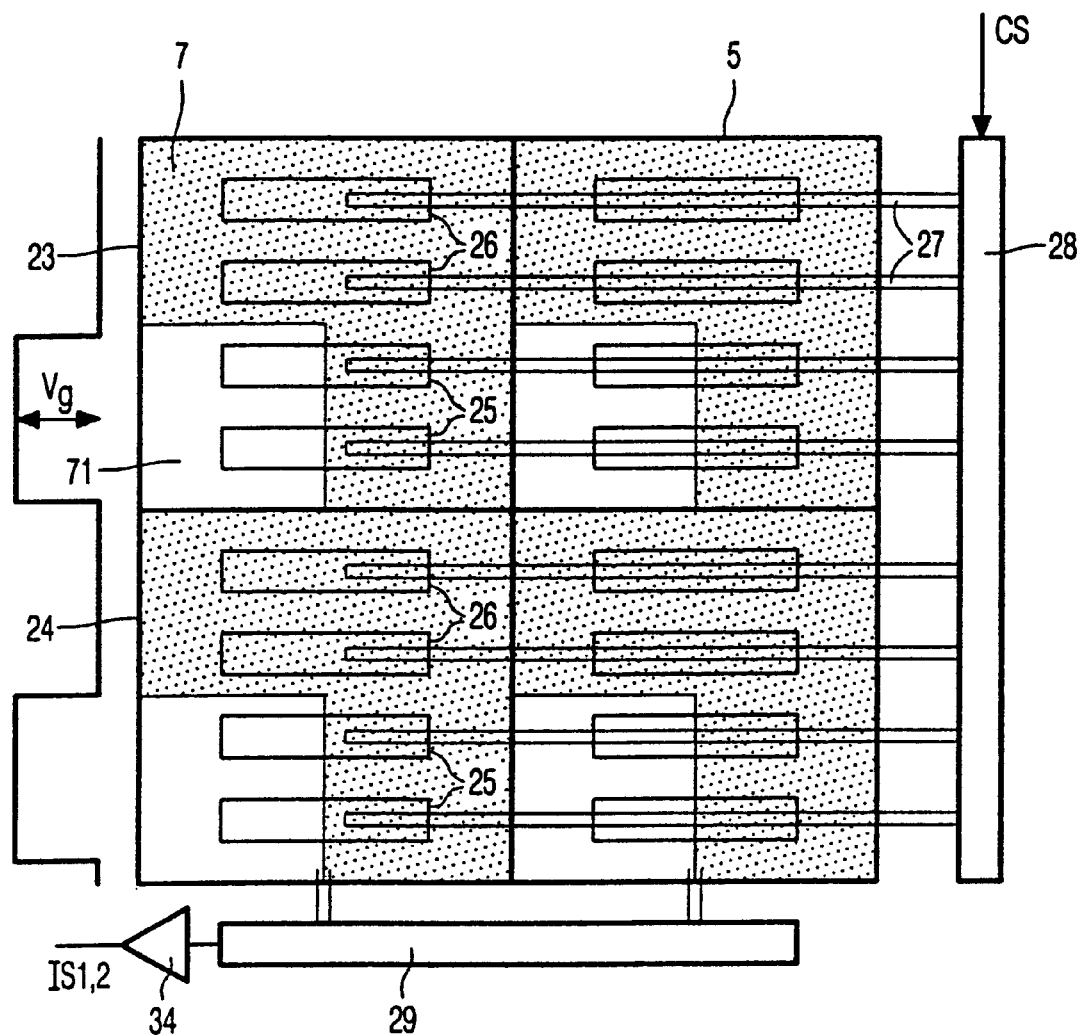
FIGS. 2 and 3 show diagrammatically a partial front view of image sensors used in the X-ray examination apparatus according to the invention.

FIG. 2 is a diagrammatic front view of a part of image sensors used in the X-ray examination apparatus according to the invention. A front view of the image sensor is to be understood to mean herein the side on which the light of the optical image is incident. The part shown in FIG. 2 is a part comprising 2×2 neighboring sensor elements 23, 24 of one of the image sensors 3, 4. In practice, use is made of image sensors comprising a large number of sensor elements, for example 512×1024 or even 1024×1024 sensor elements. For each sensor element four gate contacts 25, 26 are provided on the surface 5 of a semiconductor body of the image sensor on which the light is incident. Electric gate voltages $V_g$ are applied to the individual gate contacts 25, 26 via control lines 27. In order to control the gate voltages on the gate contacts, the gate contacts are connected to the row driver circuit 28 via the control lines 27. The sensitivity of the sensor elements is dependent on the gate voltage applied thereto. In the example shown in FIG. 2, two gate contacts 25 receive a gate voltage which makes the sensor element 25 sensitive to the incident light. Because of the applied gate voltage $V_g$, electric charge carriers released by the incident light are collected in the semiconductor material of the sensor element. No gate voltage is applied to the gate contacts 26 of the sensor element 23, so that the electric charges collected by the gate contacts 26 remain separated from one another in the neighboring sensor elements 23, 24. The collected electric charges in the individual sensor elements as described with reference to the sensor element 23 are read out from the image sensor and the sub-image signals are derived from the charges read out. During reading out, the collected charges are preferably shifted through the image sensor by shifting the charges repeatedly from one region underneath the gate contacts 25 to regions underneath neighboring gate contacts 26 by successively applying the gate voltages to gate contacts of the respective neighboring sensor elements. The collected charges are shifted per column of sensor elements to a read-out register 29 and are subsequently applied from the read-out register 29 to a read-out amplifier 34. The read-out amplifier 34 of the image sensor supplies an output signal whose signal levels represent the magnitudes of the collected electric charges, so the brightness values of the optical image. For example, the sub-image signals IS1, IS2 constitute the output signals of the respective output amplifiers 34 of the image sensors 3, 4.

The filter section 7 in the present embodiment is formed by yellow filters, each of which covers approximately three quarters of the surface on which the light of each of the sensor elements 23, 24 is incident. When the optical spectral filter element 8 is arranged in the light beam 39, essentially only blue light can reach the sensor elements via the parts 71 which are not covered by the yellow filter. It is thus achieved that the active surface area of each of the sensor elements is reduced to approximately one quarter and hence the spatial resolution is increased proportionally. When the optical spectral filter element is positioned outside the light beam 39, essentially all spectral components of the light of the optical image reach the sensor elements. The yellow light passes through the yellow filter 7 and also reaches the parts 71 of the sensor elements which are not covered by the yellow filter, thus generating charge carriers in substantially the entire part of the sensor elements in which the gate contacts are energized by the gate voltage. The blue light does not pass through the part 71 covered by the yellow filter and releases electric charge carriers in the part 71 of the sensor elements which is not covered by the yellow filter.

Figure 3:
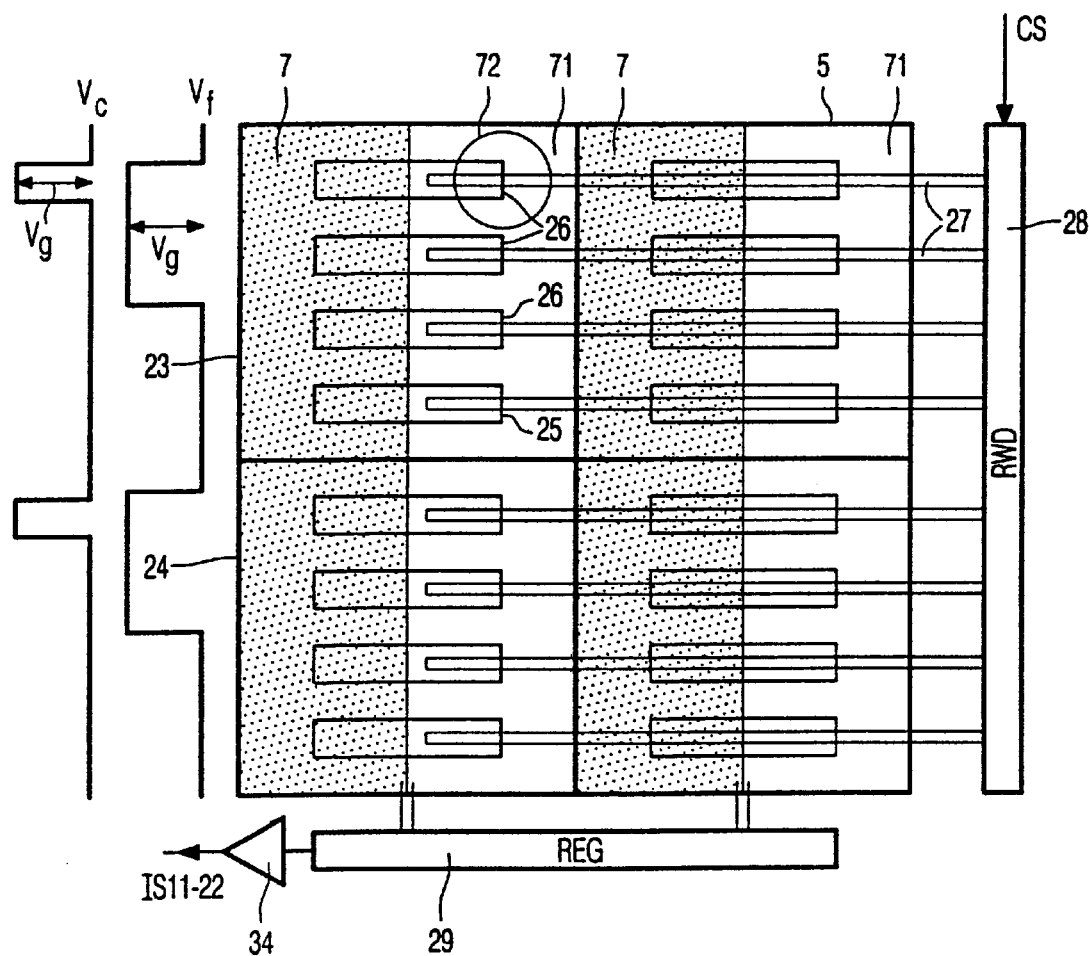

FIG. 3 shows a further embodiment of an image sensor used in the X-ray examination apparatus according to the invention. Each time approximately half of the sensor elements in the embodiment shown in FIG. 3 is covered by the yellow filter 7. The yellow filter is now formed by strips extending in the direction of the columns of sensor elements. The lateral direction is in this case the direction in the plane perpendicular to the longitudinal axis of the strips. The width of the strips amounts to half the width of each of the sensor elements. When the optical spectral filter element 8 is positioned in the light beam, essentially only blue light is incident on the image sensor and the blue light can penetrate only the half 71 of the semiconductor body of each of the sensor elements which is not covered by the yellow filter. When the optical spectral filter element is positioned in the light beam 39, the row driver circuit 28 ensures that per sensor element only one of the four gate contacts is energized by the gate voltage. It is thus achieved that the incident (blue) light releases charge carriers exclusively in the part 71 of the sensor element 5 which is not covered by the yellow filter 7 and where the gate voltage is applied by the gate contact 25. The active surface area of each of the sensor elements can thus be reduced to approximately one quarter of the overall surface area of each of the sensor elements. Each time a different part of the individual sensor elements is made sensitive to the optical image by applying the gate voltage successively to a different gate contact of each of the sensor elements. This means overall that the sensitive part of each of the sensor elements is displaced in space. For successive adjustments of the gate voltages applied to the different gate contacts, successive sub-image signals are derived by each of the image sensors. The image sensor notably supplies two sub-image signals IS11, IS12 which relate to different parts in space of the optical image which are picked up by individual regions underneath individual gate sensors. Similarly, the image sensor 4 also supplies two sub-image signals IS21, IS22 of this kind. The sub-image signals IS11, IS12, IS21, IS22 are combined by the combination unit 33 so as to form an image signal which represents an image comprising 2024×2024 pixels.

When the optical spectral filter element is not positioned in the light beam, the row driver circuit ensures that the gate voltage is applied to a plurality of gate contacts of each of the sensor elements. Practically all spectral components, blue and yellow, of the light of the optical image can then release charge carriers in the semiconductor material of the sensor elements, said charge carriers being collected underneath the plurality of gate contacts 25 whereto the gate voltage is applied. According to this adjustment of the gate voltages applied to a plurality of gate contacts of each of the sensor elements, the active surface area of the sensor elements is increased so that the sensitivity is enhanced but the spatial resolution is reduced.

Suitable results have been achieved notably by using a so-called P20 phosphor for the phosphor layer 15. Such a P20 phosphor emits light with a spectral distribution more or less in conformity with a bell-shaped curve with a mean wavelength of approximately 525 nm and a standard deviation of approximately 90 nm. The P20 phosphor emits more or less green light of a wavelength in the range from 460 to 630 nm. The blue filter transmits light of a wavelength shorter than 495 nm substantially without attenuation and substantially completely blocks light of a wavelength longer than 505 nm. The yellow filter essentially transmits light of a wavelength greater than 580 nm and mainly blocks light having a wavelength shorter than 470 nm. The yellow filter partly transmits light of a wavelength in the range from 470 to 580 nm; the yellow filter transmits approximately half the light of a wavelength of approximately 515 nm.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An X-ray examination apparatus comprising:
   an X-ray detector for deriving an optical image from an X-ray image, and
   an image pick-up apparatus for deriving an image signal from the optical image, which image pick-up apparatus includes an image sensor provided with a plurality of sensor elements, wherein an active surface area of individual sensor elements differs for individual optical spectral components of the optical image, and wherein the image pick-up apparatus is provided with an adjusting system for selecting such an optical spectral component in order to derive the image signal therefrom by means of the image sensor.

2. An X-ray examination apparatus as claimed in claim 1, wherein individual sensor elements are provided with an optical spectral filter section having a transmission profile which varies in a lateral direction.

3. An X-ray examination apparatus as claimed in claim 2, wherein the adjusting system is provided with an adjustable optical spectral filter unit for isolating such an optical spectral component from the optical image.

4. An X-ray examination apparatus as claimed in claim 3, wherein the transmission profile of the adjustable optical spectral filter unit is essentially complementary to a spatial part of the transmission profile of individual optical spectral filter sections of the sensor elements.

5. An X-ray examination apparatus as claimed in claim 2 wherein the image pick-up apparatus further comprises a control system for influencing the active surface area of individual sensor elements, and wherein the control system is arranged to influence the active surface area of individual sensor elements in a second direction which extends approximately transversely of said lateral direction.

6. An X-ray examination apparatus as claimed in claim 5, wherein the sensor elements are defined by gate electrodes, and wherein the control system is arranged to influence the active surface area of individual sensor elements on the basis of electric voltages applied to the gate electrodes.

7. The apparatus of claim 4 wherein the image pick-up apparatus further comprises a control system for influencing the active surface area of individual sensor elements, and wherein the control system is arranged to influence the active surface area of individual sensor elements in a second direction which extends approximately transversely of said lateral direction.

8. The apparatus of claim 7 wherein the sensor elements are defined by gate electrodes, and wherein the control system is arranged to influence the active surface area of individual sensor elements on the basis of electric voltages applied to the gate electrodes.

9. The apparatus of claim 3 wherein the image pick-up apparatus further comprises a control system for influencing the active surface area of individual sensor elements, and wherein the control system is arranged to influence the active surface area of individual sensor elements in a second direction which extends approximately transversely of said lateral direction.

10. The apparatus of claim 9 wherein the sensor elements are defined by gate electrodes, and wherein the control system is arranged to influence the active surface area of individual sensor elements on the basis of electric voltages applied to the gate electrodes.

11. An X-ray examination apparatus comprising an X-ray detector for deriving an image signal from an X-ray image, which X-ray detector is provided with an image sensor having a plurality of sensor elements, wherein an active surface area of individual sensor elements differs for individual spectral components of the X-ray image, and wherein the X-ray detector is provided with an adjusting system for selecting the individual spectral components of the X-ray image in order to derive the image signal therefrom.

12. An X-ray examination apparatus comprising:
    an X-ray detector for deriving an optical image from an X-ray image,
    an image pick-up apparatus which comprises a plurality of image sensors for deriving sub-image signals from the optical image, which image sensors are provided with a plurality of sensor elements, and
    a combination unit for combining the sub-image signals so as to form a composite image signal, wherein an active surface area of individual sensor elements differs for individual optical spectral components of the optical image, and wherein the image pick-up apparatus includes an adjusting system for selecting the individual optical spectral components in order to derive the image signal therefrom by means of the image sensor.

* * * * *